United States Patent
Yoshida

[19]

[11] Patent Number: 5,886,448
[45] Date of Patent: Mar. 23, 1999

[54] FEEDER STRUCTURE IN ELECTRIC MOTOR

[75] Inventor: Yasushi Yoshida, Kiryu, Japan

[73] Assignee: Mitsuba Corporation, Kiryu, Japan

[21] Appl. No.: 905,742

[22] Filed: Aug. 4, 1997

[30] Foreign Application Priority Data

Aug. 5, 1996 [JP] Japan .................................... 8-221721

[51] Int. Cl.⁶ .............................. H02K 5/22; H02K 5/14
[52] U.S. Cl. .............................. 310/249; 310/71; 310/89; 310/239
[58] Field of Search ............................ 310/71, 89, 239, 310/241, 242, 244, 245, 249

[56] References Cited

U.S. PATENT DOCUMENTS

| | | | |
|---|---|---|---|
| 4,041,339 | 8/1977 | Huber et al. | 310/239 |
| 4,677,333 | 6/1987 | Auzolat et al. | 310/239 |
| 4,727,274 | 2/1988 | Adam et al. | 310/239 |
| 4,978,876 | 12/1990 | Koster | 310/239 |
| 5,025,184 | 6/1991 | Sekine et al. | 310/71 |
| 5,148,073 | 9/1992 | Tamura | 310/239 |
| 5,164,625 | 11/1992 | Hofmann et al. | 310/88 |
| 5,231,321 | 7/1993 | Takigunchi | 310/51 |
| 5,291,088 | 3/1994 | Adam et al. | 310/88 |
| 5,440,186 | 8/1995 | Forsell et al. | 310/239 |
| 5,444,315 | 8/1995 | Adam et al. | 310/42 |

FOREIGN PATENT DOCUMENTS

| | | |
|---|---|---|
| 0 335 353 A2 | 10/1989 | European Pat. Off. . |
| 0 618 659 A1 | 10/1994 | European Pat. Off. . |
| 2 530 885 A1 | 1/1984 | France . |
| 195 17 667 A1 | 11/1996 | Germany . |
| WO 95/08209 | 3/1995 | WIPO . |

Primary Examiner—Nestor Ramirez
Assistant Examiner—Burton S. Mullins
Attorney, Agent, or Firm—Oliff & Berridge, PLC

[57] ABSTRACT

A feeding coupler is shown, formed as part of a brush holder. Feeding terminals are positioned within the feeding coupler rather than being embedded at the time of molding the brush holder using a resin.

The feeding coupler is shaped like a cylinder having a closed end and an opening on a side thereof that is in facing relationship with a yoke. The feeding terminals and a retainer for positioning and supporting the feeding terminals are positioned within the opening. The retainer has a holding portion, which is sandwiched between the brush holder and yoke to prevent the retainer from coming off through the opening.

13 Claims, 10 Drawing Sheets

FEEDER STRUCTURE IN ELECTRIC MOTOR

BACKGROUND OF THE INVENTION

1. Field of Invention

The present invention relates to an industrial field of electric motors employed in electrical equipment for vehicles.

2. Description of Related Art

In general, some of this kind of electric motors have a structure wherein a cylindrical brush holder in which brushes are accommodated is attached to an opening end of a yoke. Additionally, a feeding coupler in which feeding terminals used to feed power to the brushes are fitted is formed in the brush holder. In such an electric motor, when a known brush holder is molded using a resin, the feeding terminals are embedded as integral parts of a coupler case that is formed in the brush holder thus forming the feeding coupler in the brush holder.

A problem with the above-described known electric motor is that when the brush holder is molded using a resin, the feeding terminals must be inserted during the molding process. The molding is therefore time-consuming and more expensive. Additionally, when a variety of external couplers are employed, brush holders having feeding terminals associated with the external couplers embedded therein must be manufactured separately. This prevents the interchangeability of parts.

With the conventional electric motors, in addition to the step of molding the brush holder using a resin while inserting the feeding terminals, a step of electrically connecting lead stays for supporting the brushes to ends of the feeding terminals is needed. This is not only time-consuming but also poses a problem that a larger number of electrical contacts leads to a higher possibility of occurrence of imperfect feeding. The present invention attempts to solve these problems.

SUMMARY OF THE INVENTION

In consideration of the foregoing situation, the present invention attempts to solve the above problems. In an embodiment of the present invention, an electric motor has brushes accommodated in a brush holder that is attached to a yoke while being abutted with an open end of the yoke. A feeding coupler having feeding terminals, which are used to feed power to the brushes when an external coupler is connected to the motor, is formed as part of the brush holder. The feeding coupler is shaped like a cylinder with a closed bottom and an opening on a side thereof that is abutted with the yoke. Feeding terminals can be positioned through the opening on the side of the feeding coupler and a retainer for positioning and supporting the incorporated terminals can also be positioned through the opening. The retainer has a holding portion, which is sandwiched between the brush holder and yoke to prevent the retainer from coming off through the opening of the feeding coupler.

This structure obviates the need for inserting the feeding terminals at the time of molding the brush holder using a resin. As a result, molding the brush holder becomes easier and less expensive. Furthermore, even when feeding terminals having a different shape are incorporated, the brush holder can remain the same. Thus, the interchangeability of parts can be attained.

A concave groove is produced in a side of the brush holder abutting the yoke, so that the concave groove extends from the feeding coupler. The holding portion of the retainer is engaged with the concave groove, thus preventing the retainer from coming off through the opening of the feeding coupler.

The feeding terminals are formed as integral parts of lead stays for supporting the brushes. Ends of the lead stays for supporting the brushes are fixed to the brush holder such that the lead stays have ends thereof supported and secured to eliminate any backlash. Consequently, vibrations and any abnormal sounds can be prevented. Compared with a known structure in which feeding terminals and lead stays are formed as separate parts, the number of parts can be reduced. Moreover, the work of connecting the feeding terminals to the lead stays becomes unnecessary. This leads to improved workability and a reduction in the number of electrical contacts. Furthermore, high reliability can be guaranteed.

Locking claws can also be provided jutting out from the lead stays and press-fitted and secured into the brush holder to fix the lead stays to the brush holder. This helps simplify fixing of the lead stays.

In an embodiment of the present invention an annular sealing part for sealing between a yoke flange and brush holder flange is formed as an integral part of the retainer. Such an arrangement allows the yoke and brush holder to be sealed tightly without requiring a separate sealing member. This contributes to a reduction in the number of parts. Moreover, incorporation of a seal can be achieved simultaneously with incorporation of the retainer.

DETAILED DESCRIPTION OF PREFERRED EMBODIMENTS

Next, the embodiments of the present invention will be described in conjunction with the drawings. In the drawings, there is shown an electric motor assembly 1 employed in electrical equipment for vehicles and provided with a reduction mechanism. A motor 2 of the electric motor assembly 1 includes an armature shaft, an armature core and commutator (not shown) attached to the armature shaft in one united body, a yoke 3 for housing the armature unit, and a brush 5 accommodated in a brush holder 4 that will be described later. A reduction gear unit 6 is composed of such members as a worm gear 7 formed as the distal part of the armature shaft, a worm wheel 8 to be engaged with the worm gear 7, and a gear housing 9 for housing the worm gear and worm wheel.

A yoke 3 is shaped like a cylinder with a closed end and an open end and having a lateral opening on one side thereof. A cylindrical brush holder 4 is shaped to be mated and attached to the open end of the yoke 3.

Flanges 3a and 4a are formed on the outer circumference of the open end of the yoke 3 and the outer circumference of the brush holder 4 respectively. The flanges 3a and 4a are removably connected with screws 10, whereby the brush holder 4 is secured to the yoke 3.

Brushes 5 are mounted on the distal ends of brush springs 11 that are metallic blade springs. The proximal ends of the brush springs 11 are each fixed to one end of a respective lead stay 12 by welding or other similar means so that the brush springs can be electrically connected to the lead stays 12. Feeding terminals 14 to be incorporated in a feeding coupler 13 that will be described later are formed as integral parts of the lead stays 12 at the ends of the lead stays opposite from the ends fixed to the brush springs. Power is fed to the brushes 5 through the feeding terminals 14 via the lead stays 12 and brush springs 11.

Figure 1:
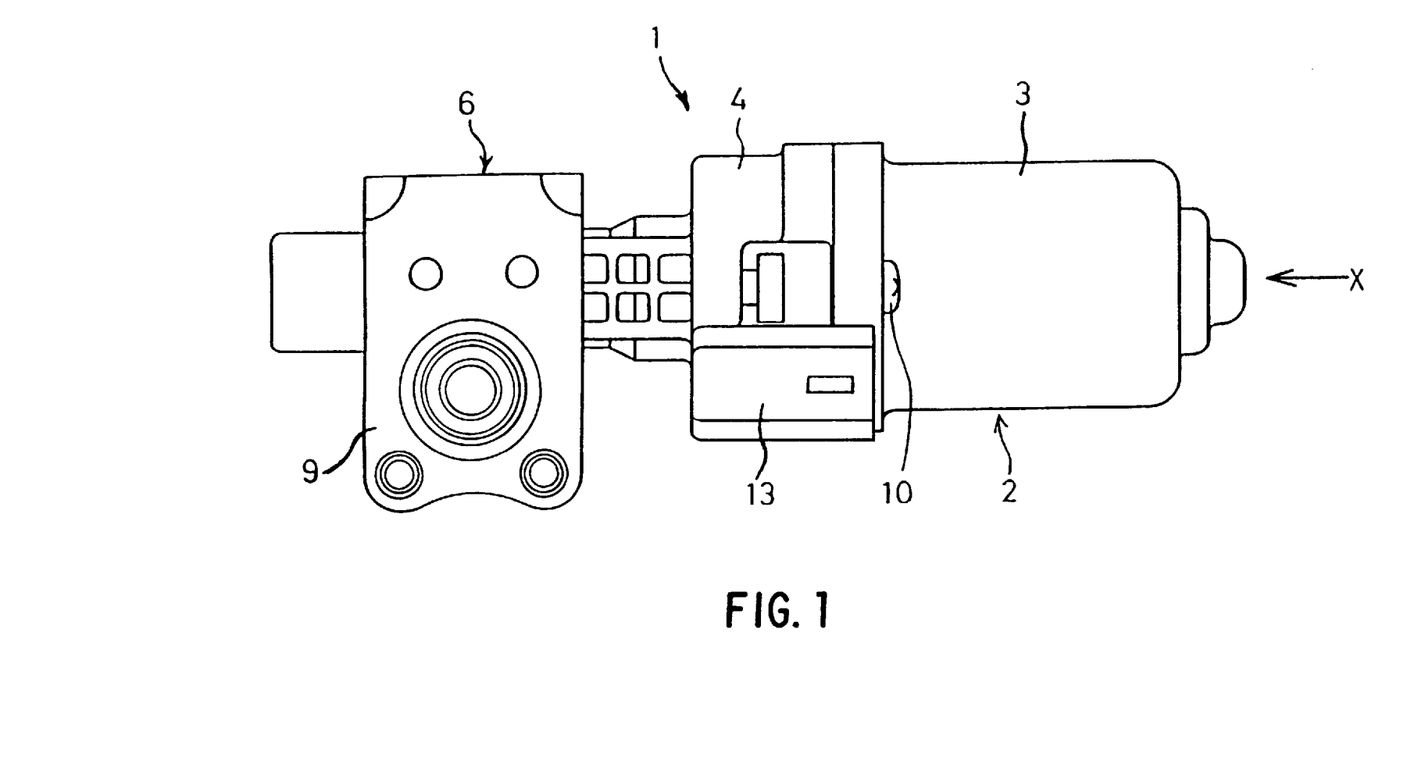
FIG. 1 is a front elevation view of an electric motor assembly unit.
Figure 2:
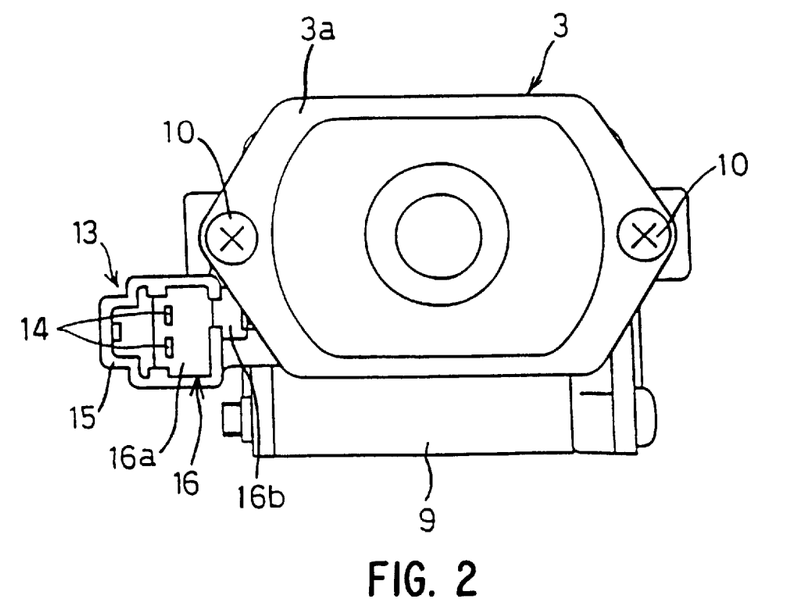
FIG. 2 is a side elevation view taken in the reaction of arrow X in FIG. 1.
Figure 3:
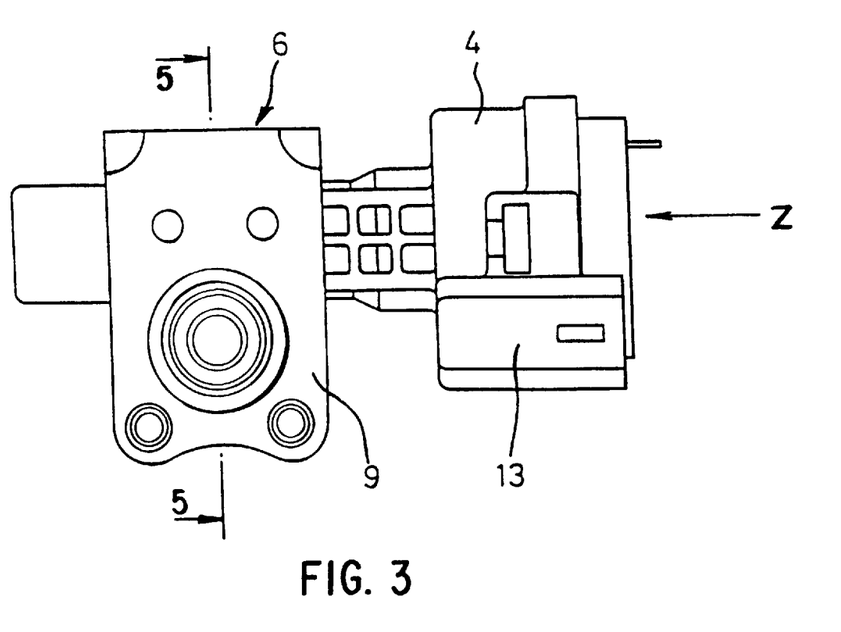
FIG. 3 is a front elevation view of the electric motor assembly without a motor.
Figure 4:
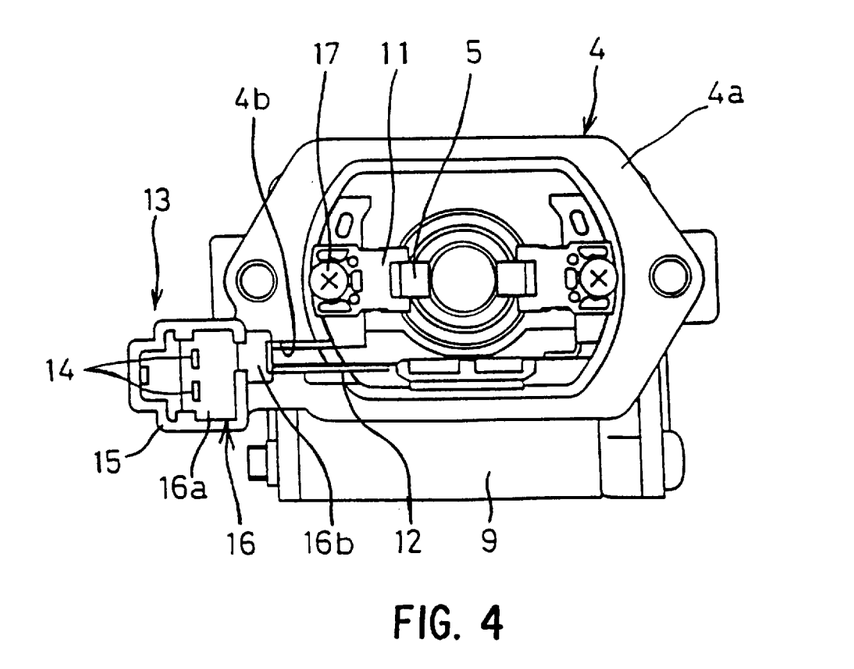
FIG. 4 is a side elevation view taken in the direction of arrow Z in FIG. 3.
Figure 5:
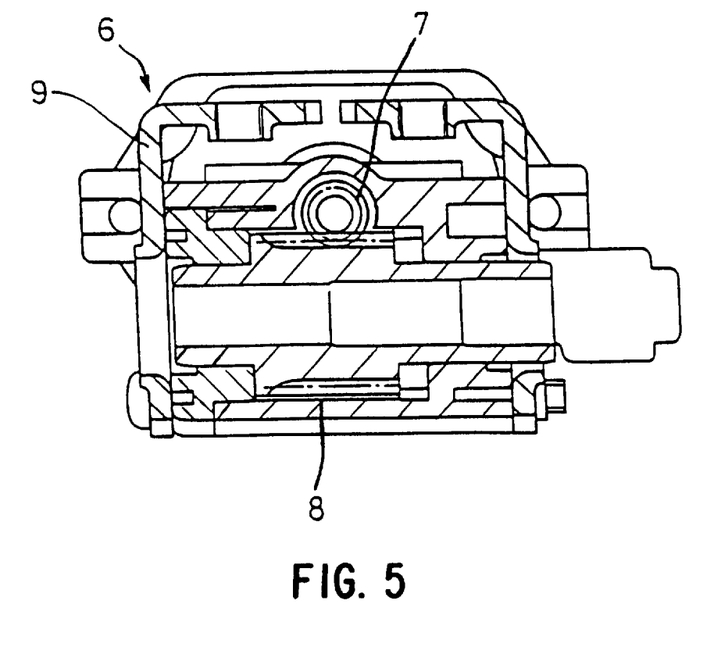
FIG. 5 is a sectional view taken along line 5—5 of FIG. 3.

The feeding coupler 13 is connected to an external coupler (not shown) of an external power supply in order to feed power to the brushes 5. A coupler case 15 that outlines the feeding coupler 13 is formed as an integral part of the brush holder 4 so that the coupler case 15 protrudes out from the outer circumference of the flange 4a. The coupler case 15 is located at a position coincident with a position on the outer circumference of the yoke flange 3a at which an external coupler will not be interfered with by the yoke flange 3a when connected. The coupler case 15 is shaped like a cylinder having a closed end and an open end and having a lateral opening on a side thereof opposed to the yoke flange 3a. A concave groove 4b, as shown in FIGS. 4 and 6, provides a passage through the brush holder flange 4a on the surface that mates with yoke flange 3a and leading to the coupler case 15 so that the concave groove 4b provides communication between the cylindrical interior of the coupler case 15 with the interior of the brush holder 4.

Figure 6:
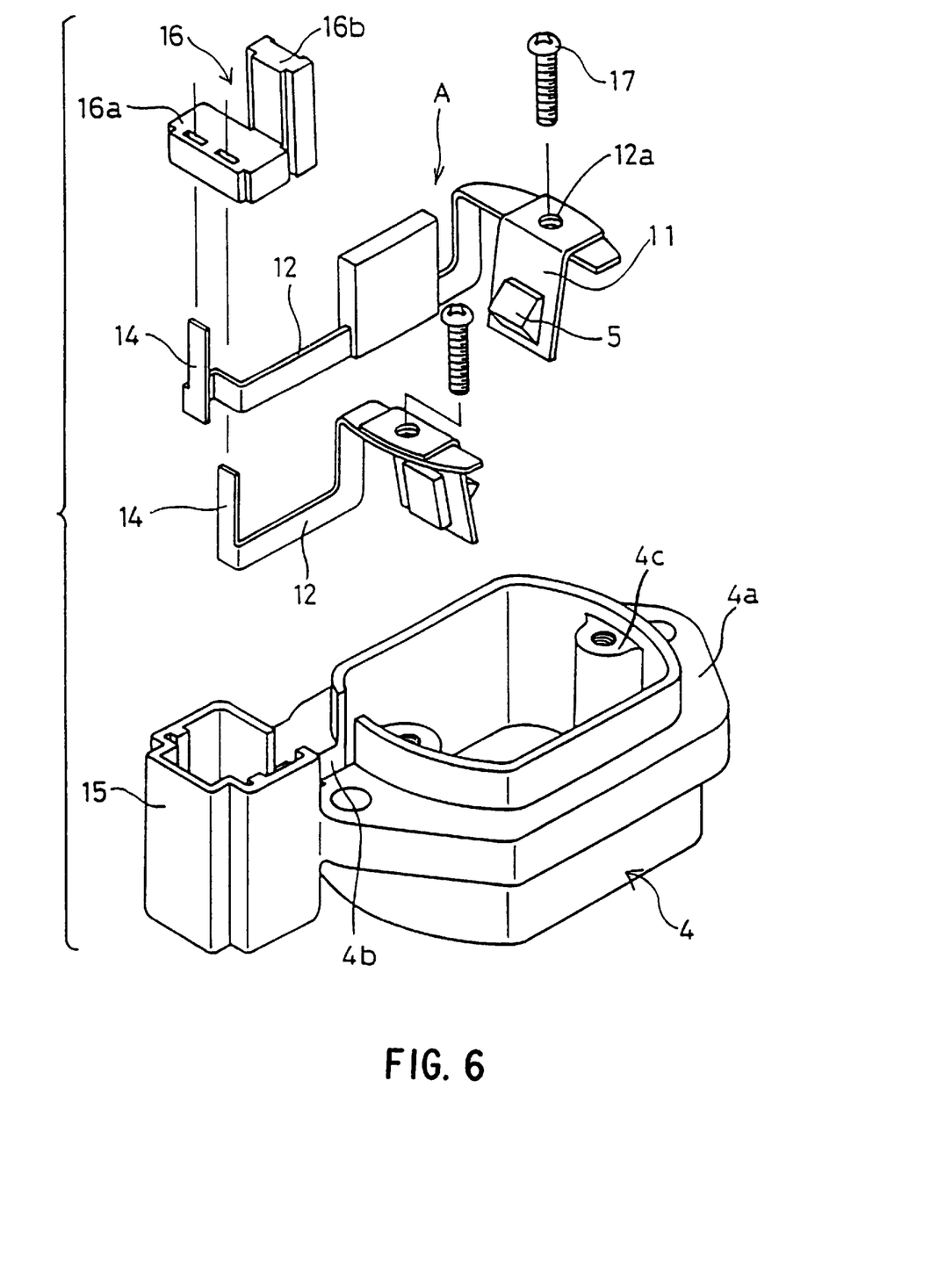
FIG. 6 is an exploded perspective view of a feeding coupler and brush holder.

A brush unit A, as shown in FIG. 6, composed of the brushes 5, brush springs 11, lead stays 12, and feeding terminals 14 is fitted in the brush holder 4 and coupler case 15. The feeding terminals 14 and the ends of the lead stays 12 leading from the feeding terminals are put through the openings of the coupler case 15 and flange concave groove 4b. A retainer 16 that will be described later is also put through the opening of the coupler case 15. The feeding terminals 14 can thus be positioned in and supported by the coupler case 15. Ends of the lead stays 12 are fixed to the brush holder 4 by inserting screws 17 into screw holes 12a bored in the brush springs 11 and engaging them in screw seats 4c.

Figure 7A:
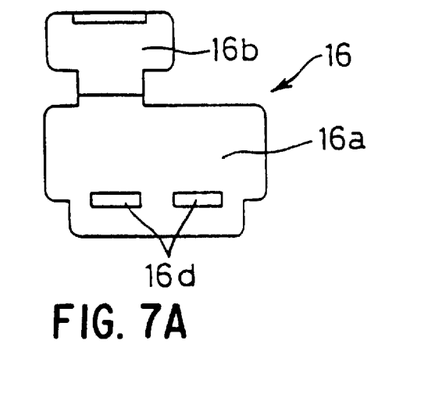
FIGS. 7A to 7E are a plan view of a retainer, front view thereof, bottom view thereof, back view thereof, and a partly-cut left side view thereof respectively.
Figure 7B:
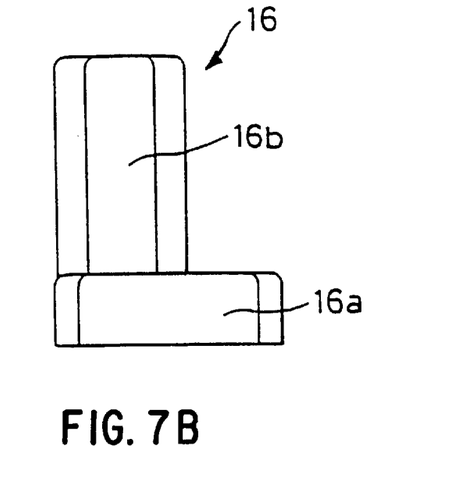
Figure 7C:
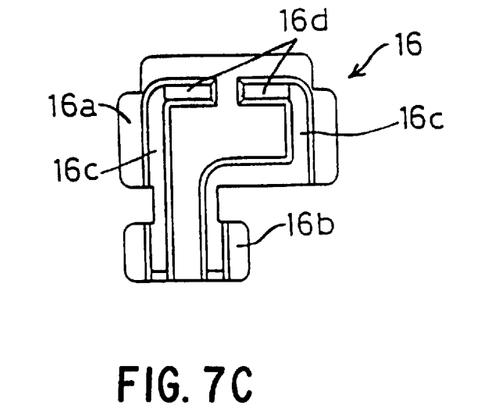
Figure 7D:
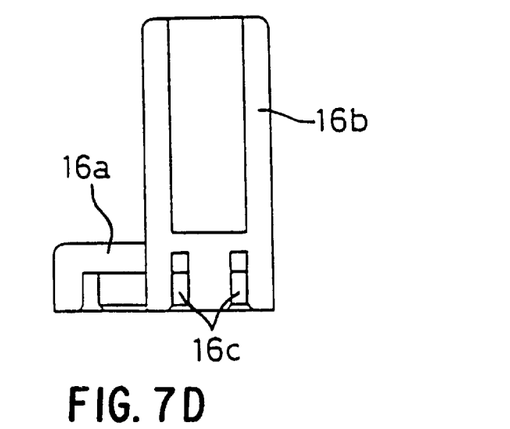
Figure 7E:
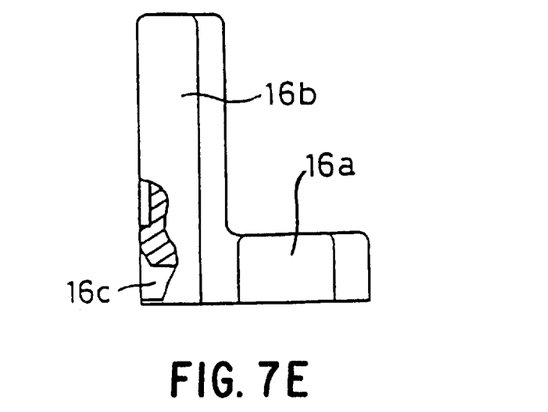

The retainer 16 includes a terminal supporting part 16a to be engaged with the coupler case 15, and a holding portion 16b to be engaged with an end of the concave groove 4b on the side of the coupler case 15. The bottoms of the terminal supporting part 16a and holding portion 16b (opposed to the bottom of the coupler case 15 and the bottom of the concave groove 4b) are formed continuously as shown in FIGS. 7A–7E. Stay engagement grooves 16c with which the ends of the lead stays 12 leading from feeding terminals 14 are engaged, are formed into the bottoms of the terminal supporting part 16a and holding portion 16b, as shown in FIG. 7C. Terminal through holes 16d, through which the feeding terminals 14 are passed and supported, are bored in the terminal supporting part 16a so that the terminal through holes communicate with the stay engagement grooves 16c.

The holding portion 16b is formed so that the top of the holding portion 16b abuts on the yoke flange 3a when the retainer 16 is positioned in the coupler case 15 and concave groove 4b with the retainer 16 abutting on the bottoms thereof, and the brush holder flange 4a and yoke flange 3a are joined together. The holding portion 16b is thus sandwiched between the yoke flange 3a and the bottom of the concave groove 4b, and will therefore not come off when the brush holder is joined with the yoke.

In the above-described structure, the feeding terminals 14 are formed as integral parts of the lead stays 12 at the ends of the lead stays opposite from the ends joined to brush springs 11. The feeding coupler 13 is assembled by fitting the feeding terminals 14 in the coupler case 15 formed as part of the brush holder 4, with the coupler case 15 being shaped like a cylinder with a closed end and having an opening on a side thereof opposed to the yoke flange 3a. The concave groove 4b is bored in the brush holder flange 4a leading to the coupler case 15 and in opposing relationship with yoke flange 3a when the brush holder is joined to the yoke. The feeding terminals 14 and the ends of the lead stays 12 leading from terminals 14 are put through the openings, and the retainer 16 is then assembled in order to position and support the feeding terminals 14 and the ends of the lead stays 12 leading from terminals 14. The retainer 16 is prevented from coming off through the openings because the retainer holding portion 16b is sandwiched between the yoke flange 3a and the bottom of the concave groove 4b with the brush holder flange 4a and yoke flange 3a joined together.

As a result, it is not necessary to insert the feeding terminals 14 at the time of molding the brush holder 4 using a resin. The brush holder 4 can be molded readily. This contributes to a cost reduction. Furthermore, even when feeding terminals 14 have different shapes that match any of various external couplers, the same brush holder 4 can be used. Thus, interchangeability of parts can be attained and a further cost reduction can be achieved.

Moreover, the feeding terminals 14 are formed as integral parts of the lead stays 12. Compared with a known structure in which a brush holder is molded using a resin with feeding terminals inserted therein, and the feeding terminals and lead stays are separate parts, the number of parts can be reduced. Furthermore, the work of joining the feeding terminals 14 with the lead stays 12 becomes unnecessary. This results in improved workability and a reduced number of electrical contacts. High reliability can be guaranteed.

Figure 8:
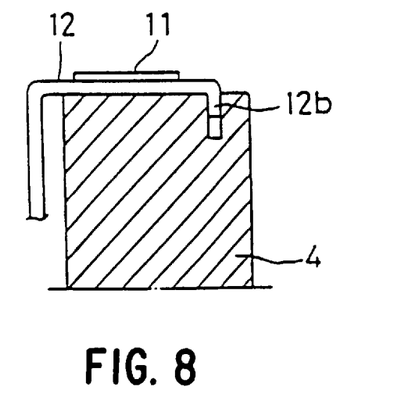
FIG. 8 is a sectional view of a lead stay fixing part or locking claw in the second embodiment.

The present invention is not limited to the above-described embodiment. In another embodiment shown in FIG. 8, locking claws 12b may be protruded out from the lead stays 12 and press-fitted and secured into the brush holder 4 in order to fix the brush supporting parts of the lead stays 12 to the brush holder 4.

Figure 9:
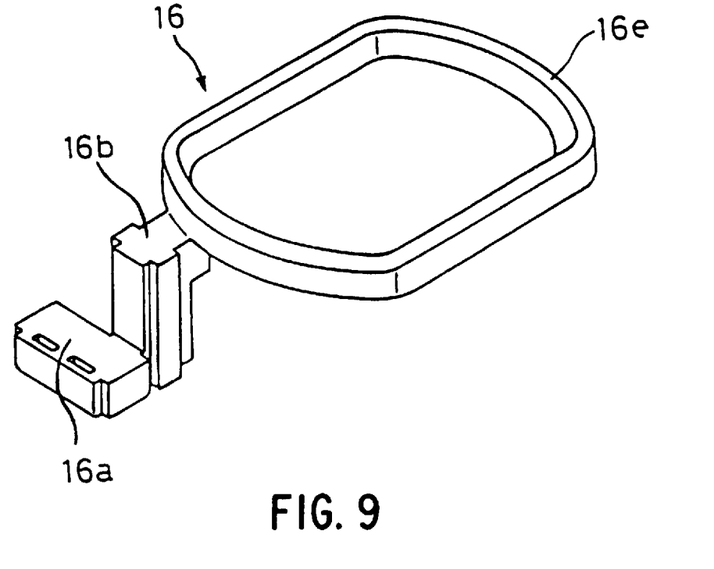
FIG. 9 is a perspective view of a retainer in the third embodiment.
Figure 10:
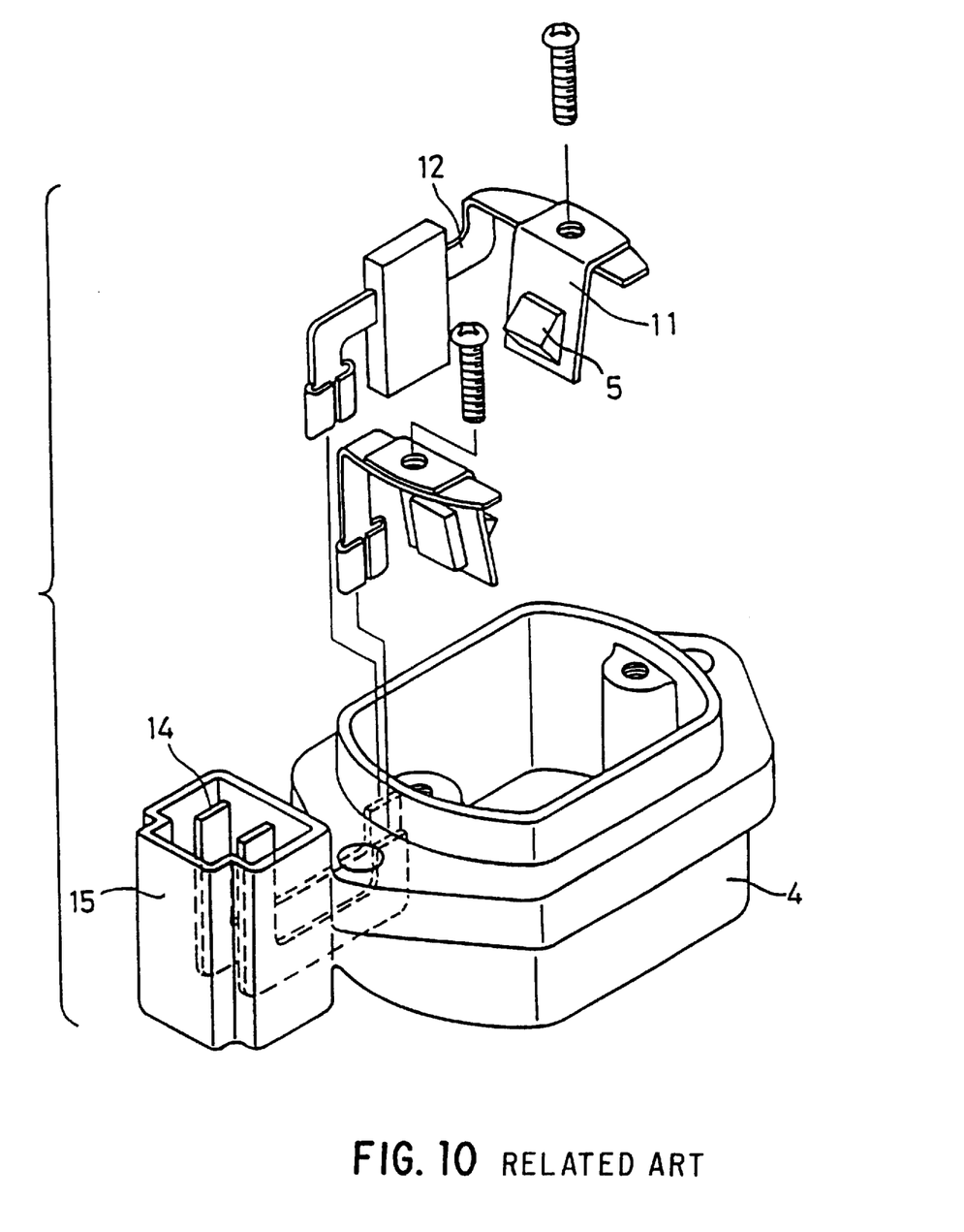
FIG. 10 is an exploded perspective view of a feeder in a prior art.

In the embodiment shown in FIG. 9, the retainer 16 is made of a sealing material such as rubber. An annular sealing part 16e for sealing the yoke flange 3a and brush holder flange 4a is formed as an integral part of the retainer 16. In this embodiment, the yoke and brush holder can be sealed without a separate sealing member. This contributes to a reduction in the number of parts. Moreover, there is the benefit that incorporation of a seal can be carried out simultaneously with incorporation of a retainer.

What is claimed is:

1. A feeder structure in an electric motor having brushes, said brushes being positioned within a brush holder and said brush holder being abutted at an open end face of said brush holder with an open end face of a yoke, said feeder structure comprising:

a feeding coupler case formed integrally with said brush holder and having a tubular configuration, a slot formed lonitudinally in a wall of the feeding coupler case, the feeding coupler case having a closed end and having an opening on a side thereof in facing relationship with said open end face of said yoke;

feeding terminals for electrical connection with an external coupler to provide electric power to said brushes, said feeding terminals being positioned and supported by a retainer within said feeding coupler case through said opening, said retainer having a holding portion sandwiched between said brush holder and said yoke such that said retainer is held in said opening, said holding portion disposed in the slot to form a substantially continuous wall with the wall of the feeding coupler case.

2. The feeder structure according to claim 1, wherein a concave groove is formed in a portion of said open end face of said brush holder extending from said feeding coupler case to a cavity of said brush holder within which said brushes are positioned;

said holding portion of said retainer mating with said concave groove in said sandwiched position between said brush holder and said yoke.

3. The feeder structure according to claim 2, wherein said feeding terminals are formed integrally with lead stays at first ends of said lead stays and said brushes are supported at second ends of said lead stays with said second ends being fixed to said brush holder.

4. The feeder structure according to claim 3, wherein said lead stays include projecting portions that extend from said lead stays and are press-fitted into said brush holder for fixing said lead stays to said brush holder.

5. The feeder structure according to claim 4, wherein said retainer includes an annular sealing portion formed integrally with said retainer and extending in sealing relationship between said open end face of said brush holder and said open end face of said yoke.

6. The feeder structure according to claim 3, wherein said retainer includes an annular sealing portion formed integrally with said retainer and extending in sealing relationship between said open end face of said brush holder and said open end face of said yoke.

7. The feeder structure according to claim 2, wherein said retainer includes an annular sealing portion formed integrally with said retainer and extending in sealing relationship between said open end face of said brush holder and said open end face of said yoke.

8. The feeder structure according to claim 1, wherein said feeding terminals are formed integrally with lead stays at first ends of said lead stays and said brushes are supported at second ends of said lead stays with said second ends being fixed to said brush holder.

9. The feeder structure according to claim 8, wherein said lead stays include projecting portions that extend from said lead stays and are press-fitted into said brush holder for fixing said lead stays to said brush holder.

10. The feeder structure according to claim 9, wherein said retainer includes an annular sealing portion formed integrally with said retainer and extending in sealing relationship between said open end face of said brush holder and said open end face of said yoke.

11. The feeder structure according to claim 1, wherein said retainer includes an annular sealing portion formed integrally with said retainer and extending in sealing relationship between said open end face of said brush holder and said open end face of said yoke.

12. The feeder structure according to claim 1, the retainer including a terminal supporting part in which said feeding terminals are positioned and supported, said holding portion extending from said terminal supporting part towards said open end face of said yoke.

13. The feeder structure according to claim 12, the terminal supporting part having through holes in which the feeding terminals are positioned.

* * * * *